June 24, 1930.  W. S. GRIFFITH  1,766,745
THICKNESS GAUGING DEVICE FOR LEATHER, ETC
Filed June 28, 1928  3 Sheets-Sheet 1

Fig. I

Inventor
Winfred S. Griffith
By Attorneys

June 24, 1930.  W. S. GRIFFITH  1,766,745

THICKNESS GAUGING DEVICE FOR LEATHER, ETC

Filed June 28, 1928  3 Sheets-Sheet 2

Inventor
Winfred S. Griffith
By Attorneys

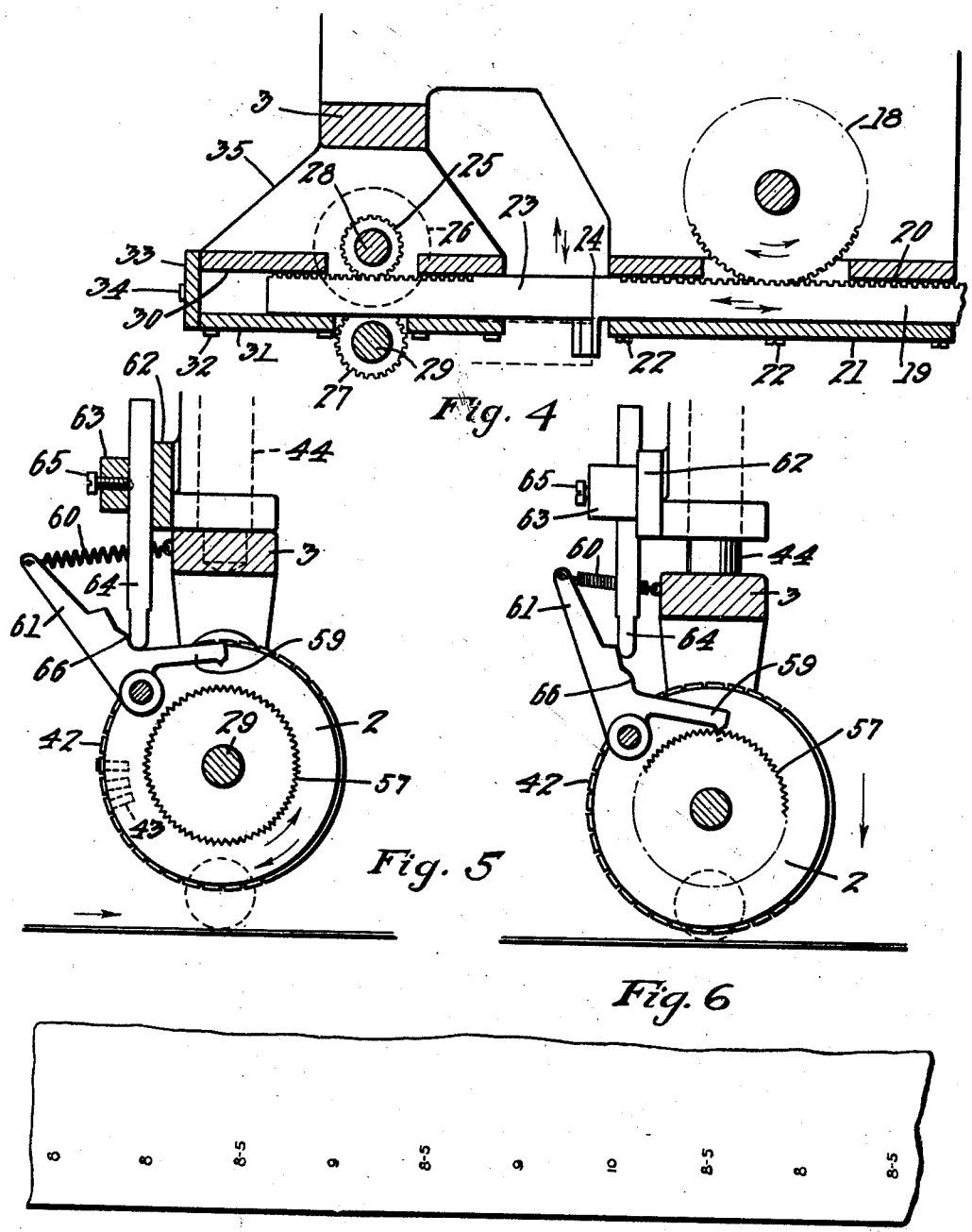

Patented June 24, 1930

1,766,745

UNITED STATES PATENT OFFICE

WINFRED S. GRIFFITH, OF WORCESTER, MASSACHUSETTS, ASSIGNOR TO GRATON & KNIGHT COMPANY, OF WORCESTER, MASSACHUSETTS, A CORPORATION OF MASSACHUSETTS

THICKNESS-GAUGING DEVICE FOR LEATHER, ETC.

Application filed June 28, 1928. Serial No. 288,938.

This invention consists in a machine comprising, in combination, gauging means for ascertaining the thickness of a sheet of leather or other sheet material, and means controlled by the said thickness-gauging means for stamping upon the leather or other sheet material marks indicating the ascertained thickness thereof.

The invention has as its purpose the provision of means for measuring the thickness of a sheet of leather, such as a tanned hide, or of other sheet material, and recording such measurement automatically directly upon the surface of the said sheet, in order to provide upon the sheet a visual record of the thickness of the same at various points, to guide in the cutting-up of the leather or other material for the various uses to which it is to be put, as well as in sorting the pieces after cutting, and in selecting pieces for certain specific uses. A tanned hide has a relatively wide range of variations in thickness at various points, such variations being of more or less practical importance in determining the choice and adaptability of different portions of the leather for different uses.

An illustrative embodiment of the invention is shown in the accompanying drawings, in which Fig. 1 is a side elevation of the complete gauging and recording device, indicating also the actuating mechanism, a surface for supporting the sheet to be gauged, and feed mechanism for advancing the sheet;

Fig. 4 is an enlarged detail view in vertical section on the line 4—4 of Fig. 2, looking in the direction of the arrows, and showing the jointed rack-bar and its coacting pinions;

Figure 2:
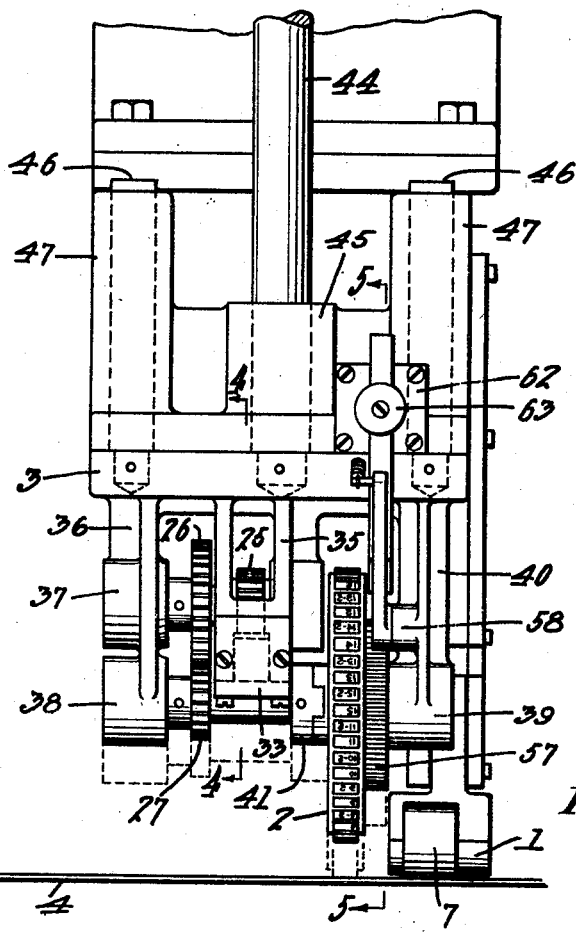
Fig. 2 is a front view of the same on a slightly larger scale, certain of the parts of Fig. 1 being omitted.

Figs. 5 and 6 are detail views in vertical section on the line 5—5 of Fig. 2, looking in the direction of the arrows, and on the same scale as Fig. 2, showing the stamping-wheel with the means for holding it from rotation during stamping, respectively disengaged from said wheel and engaged therewith to hold it from turning; and Fig. 7 is a view of the surface of a sheet operated on by the device, showing the manner of recording the ascertained thickness thereupon.

At 1 is shown a gauge for measuring the thickness of the leather or other sheet material, and at 2 is a stamping-wheel having its periphery provided with a series of numbers indicating different thicknesses of the material operated upon. The said stamping-wheel is carried by a reciprocatory head 3, through the movement of which the stamping of the leather or other material is effectuated. In accordance with my invention, I combine these elements with such operative relationship between the gauge and the stamping-wheel and the wheel is controlled from the gauge in a manner providing for positioning the wheel to stamp upon the material operated upon a marking corresponding with the thickness ascertained by the gauge.

The device of the invention is designed to be provided in plurality when used to gauge sheet material having considerable width, such as a side of leather, in order that a comprehensive gauging of the entire sheet may be effected at one time. For this purpose, a number of like embodiments of the invention are mounted, above a table 4 or other plane surface, upon a cross-girth 5 extending across parallel to the table 4 and suitably supported in fixed spaced relation thereto. The individual gauging devices may be located at any desired distance apart from each other commensurate with the thoroughness with which the area of the side requires to be gone over in the gauging.

Figure 1:
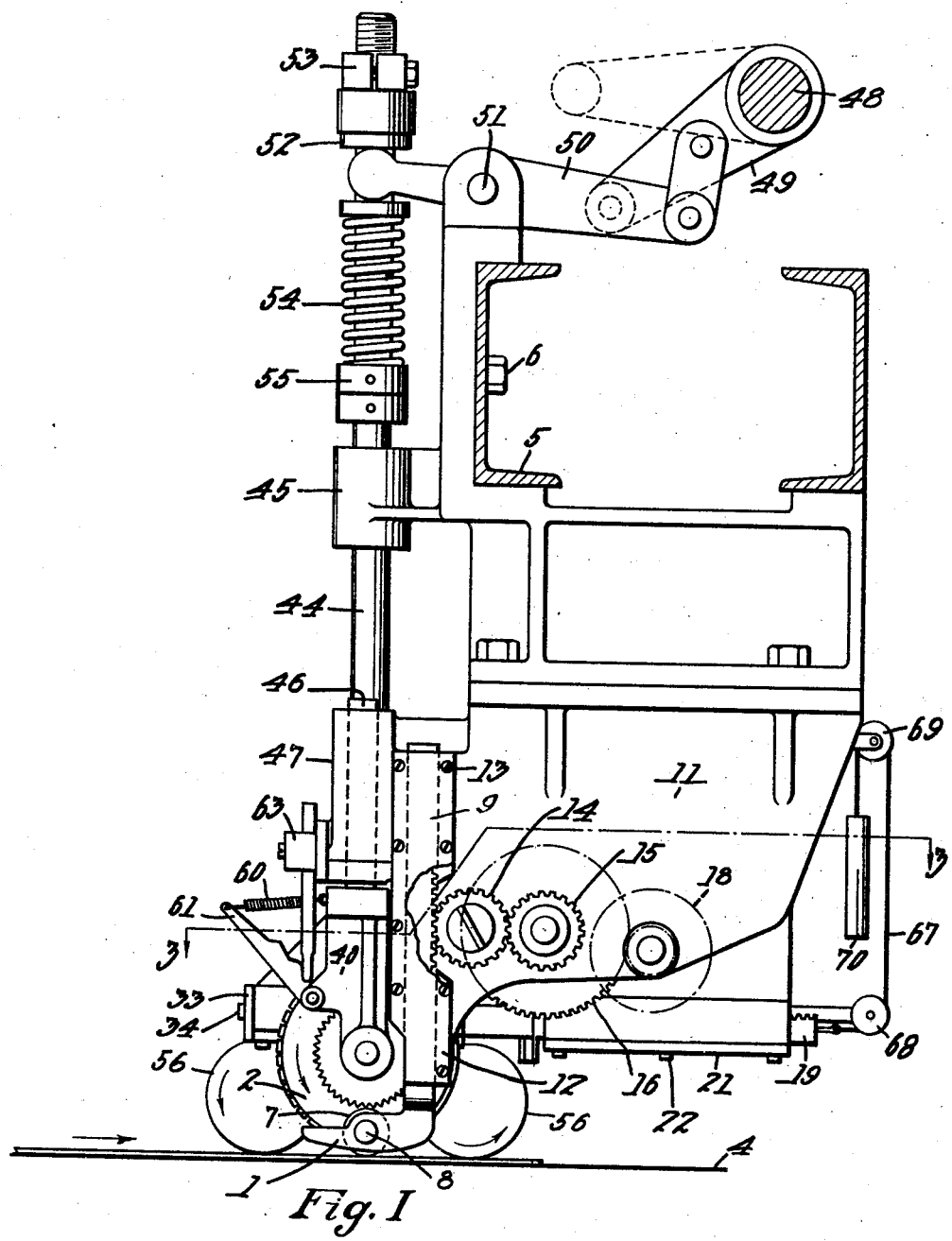

The framework of the gauging device is fixed to the cross-girth 5, as by a screw 6, Fig. 1, so as to be suspended over the table 4, with clearance to permit the passage of a hide or other sheet of material under it when slid or fed under it along the table surface 4. This table surface 4 is the datum surface from which measurements of the thickness are made, the extent of displacement of the gauge 1 away from said surface by an interposed hide or other sheet of material causing a proportionate rotation of stamping-wheel 2 adapted to bring into stamping position the number or character representing the said extent of displacement, or in other words, the thickness of the sheet being gauged.

Preferably, in order to reduce friction, the gauge 1 has mounted in its foot an anti-friction roll 7, freely rotatable upon a pin 8 fixed in opposite sides of the forked foot, the surface of said roll 7 opposed to the surface of table 4 constituting the actual gauging surface that is brought into contact with the surface of the leather or other sheet material.

The gauge 1 has a shank 9 which extends perpendicularly away from the table 4, being mounted for free sliding movement in a way 10 formed in the lower portion 11 of the framework of the machine, and retained therein by a cover-plate 12 held on by screws 13, 13. The rearward edge of this shank 9 is provided with rack-teeth engaged with those of a gear 14 constituting one terminal of a multiplying gear-train comprising the gears 15, 16, 17 and 18, which are suitably mounted in the lower portion 11 of the framework, the opposite terminal 18 being in engagement with a rack 19 sliding in a way 20 disposed in the said lower portion 11 in parallelism with the table 4. A cover-plate 21 applied to the open under side of said way 20 by screws 22, 22, retains the rack 19 therein.

Figure 3:
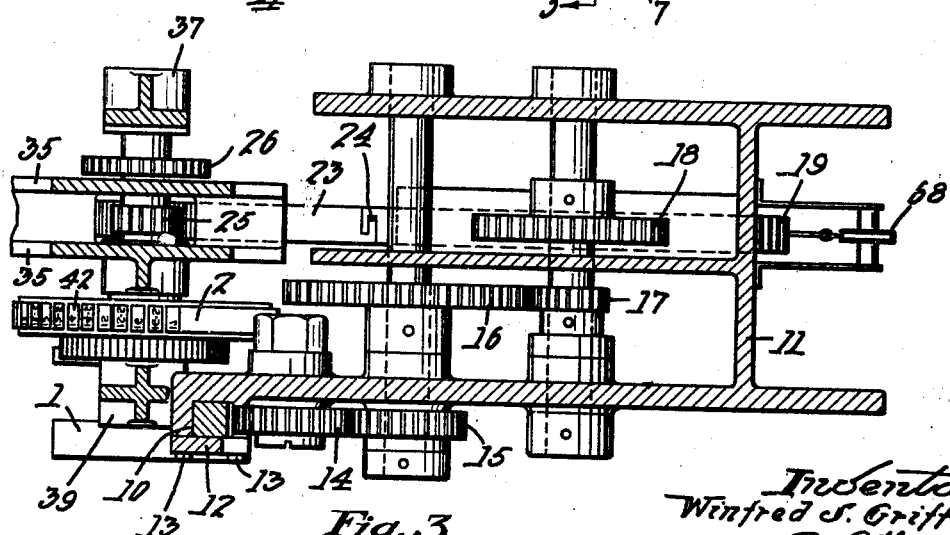
Fig. 3 is a view in horizontal section on the line 3—3 of Fig. 1, looking in the direction of the arrows, the scale being slightly larger than in Fig. 1.

The front end of the rack 19 is combined with a similar rack 23 by a joint 24 adapted to transmit to such rack 23 the exact amount of endwise movement received from the train of gearing as the gauge 1 rises and falls in passing over the leather or other sheet material moving under its roll 7. But the joint 24 is contrived with interlocking flanges as shown in Fig. 3, to permit the relative up-and-down movement of the forward rack 23 necessary to provide for bringing the stamping-wheel 2 in contact with the surface of the leather or other sheet material in recording thereon the thickness ascertained by the gauge.

The forward rack 23 serves to impart rotation to the stamping-wheel 2 through an intermediate train of multiplying gears comprising the pinion 25 having its teeth engaged by the teeth of the rack 23, and the coengaged gears 26 and 27, of which the first is fixed upon the same shaft 28 as the pinion 25, and the second fixed upon the same shaft 29 as the stamping-wheel 2.

Thus up-and-down movement of the gauge 1 is caused to impart a back-and-forth movement to the jointed rack-bar comprising the connected racks 19 and 23 which in turn rotates the stamping-wheel 2 an angular amount exactly proportionate to the amount of linear movement of the gauge 1.

The stamping-wheel 2, the forward rack 23, and the intermediate gearing and shafts for the latter, are all mounted in connection with the reciprocatory head 3. The rack 23 is mounted for free sliding movement in a way 30 formed at the lower ends of two flaring webs 35, 35, depending from the reciprocatory head 3, being retained therein by a cover-plate 31 secured to the bottom of the way by screws 32, 32, and the front end of the way being closed by a plate 33 attached by screws 34. The shaft 28 on which are mounted the pinion 25 and gear 26 rotates in bearings made in these flaring webs 35, and in a bearing 37 formed in an arm 36 depending from the head 3. The shaft 29 which has the gear 27 and the stamping-wheel 2 fixed upon it is supported in a second bearing 38 formed in the said arm 36, and at its other end in a bearing 39 at the lower end of another arm 40 on the said head 3. The stamping-wheel 2 herein is caused to turn in unison with the shaft 29 through engagement of a transverse slot across its hub by clutch-fingers upon a collar 41 that is pinned or otherwise secured upon the shaft 29. The periphery of the stamping-wheel 2, as stated, is provided with a series of numbers properly spaced about the circumference of the wheel and having the proper values to represent the extent of linear displacement of the gauge 1 away from the table 4 by an interposed sheet of leather or other material.

For example, if the thickness of a side of leather at the point where the roll 7 of the gauge 1 rests upon it is 9/128ths of an inch, the figure 9 of the series of numbers borne by the stamping-wheel will be turned to the lowest point of the said wheel, the point nearest the underlying leather, so that when the reciprocatory head 3 is caused to descend that figure 9 will be brought into contact with the surface of the leather and stamped, embossed, or printed thereupon to leave a more or less permanent impression. The figures may conveniently be formed in relief upon the rectangular heads 42, 42, or pins 43, 43, driven into radial holes in the flat edge of the stamping-wheel 2, as shown in Fig. 5.

The head 3 is mounted for up-and-down reciprocation upon a shaft 44 having its lower end fixed in said head and sliding in bearings 45, 45, formed on the front of the framework. A pair of studs 46, 46, fixed in the head 3 near the ends thereof, work in sleeve-bearings 47, 47, on the lower portion 11 of the framework at opposite sides of the bearing 45, and serve as guides to steady the head in the reciprocatory movements.

A downward movement is imparted to the shaft 44 periodically in any suitable manner, to carry the head and its associated parts down into the position indicated in dotted lines in Fig. 2 while the stamping-wheel stamps the value of the thickness on the surface beneath it. Herein, this is effected in simple manner by joining an arm 49, fixed on a rockshaft 48 rocked periodically, with a forked lever 50 pivoted as at 51 upon the upper portion of the framework of the machine, the forked end of such lever 50 cooperating with a collar 52 loose upon the shaft 44 to act against a threaded split-collar 53 adjustably fixed on the end of the shaft, to lift the shaft 44 and with it the head 3 when the lever 50 is moved in one direction, and acting against a spring 54 around said shaft 44, confined between the collar 52 and a collar 55 fixed on the shaft, to move the shaft and with it the head 3 yieldingly downward, for the aforesaid purpose of stamping the leather.

At 56, 56, is indicated a pair of feed-rolls to advance the side of leather or other sheet material over the table 4, to enable the gauging to be effected at successive intervals upon the piece. These may be driven in any suitable manner, at any desired speed with respect to the frequency of actuation of the rockshaft 48 to cause the thickness to be recorded upon the surface at points either close together or relatively far apart. It is desirable that the feed of the leather be arrested as the stamping-wheel 2 approaches the leather and until the stamping is completed and the head 3 rising again.

The stamping-wheel should be free to drift back and forth as the gauge 1 is passed over the surface of the moving leather or other sheet material, between the points where recordings are to be made; yet when the head 3 is descending to stamp the figures representing the thickness ascertained at that point by the gauge it is important that the stamping-wheel be steadied and held from unintended rotation arising from backlash or other causes which might give rise to erroneous or fragmentary printing of the figure. For this purpose, the stamping-wheel 2 is provided with a ratchet 57, and upon a boss 58 on the inward side of the arm 40 is pivoted a pawl 59 for engagement with such ratchet. A contracting spiral spring 60 anchored to the head 3 is attached to the extremity of the arm 61 of the pawl and tends to bring it into engagement with the teeth of the ratchet and hold the stamping-wheel from rotation.

Upon the front of the lower portion 11 of the framework is mounted a plate 62 having a boss 63 through which extends a cam 64, retained in adjusted position by a clamping-screw 65, and extending down to engage a projection 66 on the pawl to keep the latter tipped away from and out of contact with the ratchet except when the head has descended and the stamping-wheel is nearly in contact with the underlying surface. Just before such contact is made, the projection 66 passes below the end of the stationary cam 64, and the pawl is swung by its spring 60 into engagement with the teeth of the ratchet. Thus the stamping-wheel is held against rotation until the stamping has been completed and the reverse movement of the head 3 has carried the stamping-wheel up off the surface just stamped.

Preferably means will be provided for assuring close contact of the roll 7 of the gauge 1 with the underlying surface. This is conveniently effected herein by attaching a weighted cord 67 to the rearward end of the rack 19, the cord being carried over pulleys 68, 69, in connection with the lower portion 11 of the framework and equipped with a weight 70 which causes the cord to pull rearwardly upon the rack and exert sufficient yielding force to hold the roll 7 closely against the surface beneath it, and also to prevent any backlash in the intermediate connections which might introduce an error into the stamping.

Fig. 7 shows the resulting appearance of a portion of a side of leather that has been gauged by a single one of the plurality of gauging devices intended to be used across the width of the table 4. Ordinarily, the figure indicating the thickness will be stamped every few inches by each machine, and with the machines arranged in close proximity across the width of the table 4, it will be seen that a very thorough, permanent, and accurate survey of the thickness of a hide or side of leather can be made in a few minutes by the use of the present invention.

I am aware that many alternative and equivalent constructions and modifications may be made in the foregoing device by a person skilled in the art, without departing from the scope of the invention, as expressed in the claims. What I claim as my invention, and desire to secure by Letters Patent, is:—

1. A device for gauging leather comprising a fixed framework, a gauge mounted therein for relative movement, a rack mounted in said framework for endwise movement and gear-driven from said gauge, a reciprocatory head, a second rack mounted in said head and coupled to said first-named rack with capacity to move endwise in unison therewith and also for relative up-and-down movement with respect thereto, a stamping-wheel gear-driven from said second rack and bearing upon its periphery figures representing the numerical values of measurements of thickness, and means to reciprocate said head to press said stamping-wheel against material being measured by the gauge to stamp upon the surface of the said material the figure representing the measurement being taken by the gauge.

2. A device for gauging leather and other sheet material comprising in combination a gauge for measuring the thickness of the material, a reciprocatory head, a stamping-wheel having figures upon its periphery and carried by said head into and out of contact with the surface of the material, means causing the gauge to rotate the stamping-wheel to present to said surface the figure having the proper value to represent the measurement being taken by the gauge, a ratchet upon said stamping-wheel, a pawl also carried by said head, a spring tending to engage said pawl with said ratchet to prevent rotation of the stamping-wheel, said pawl having an arm provided with a cam surface, and a fixed abutment engaging the cam surface of said arm and effective to remove said pawl from the ratchet save when the stamping-wheel is in proximity to the said surface.

3. A device for gauging leather and other sheet material comprising in combination a gauge, a reciprocatory head, a stamping-wheel upon said head to stamp upon the surface of the material a number representing the value of the measurement taken by the gauge, and a train of gearing between the gauge and the stamping-wheel to give the latter angular movement proportionate to the thickness ascertained by the gauge, said train including a rack-bar jointed to permit one portion thereof to move with the said head without affecting the said angular movement derived from the gauge.

4. A device for gauging leather comprising a fixed frame work, a gauge, a rack bar supporting said gauge for vertical sliding movement in said frame work, a type wheel having a gear thereon, a horizontal movable rack bar engaging said gear, and a train of multiplying gears positively and directly connecting said rack bars.

In testimony whereof I have hereunto affixed my signature.

WINFRED S. GRIFFITH.